United States Patent [19]
Kruger

[11] Patent Number: 5,095,564
[45] Date of Patent: Mar. 17, 1992

[54] SADDLE TEE FOR IRRIGATION PIPE

[76] Inventor: Jay C. Kruger, 127A 15th St., SE., Minot, N. Dak. 58701

[21] Appl. No.: 722,319

[22] Filed: Jun. 27, 1991

[51] Int. Cl.⁵ .......................... F16L 5/00; F16L 25/00
[52] U.S. Cl. ...................................... 285/197; 285/420
[58] Field of Search ............... 285/156, 197, 180, 420, 285/921; 24/20 TT

[56] References Cited
U.S. PATENT DOCUMENTS

| | | | |
|---|---|---|---|
| 3,132,881 | 5/1964 | Corey | 285/197 |
| 3,432,188 | 3/1969 | Turner | 285/420 X |
| 3,891,150 | 6/1975 | Hoff et al. | 285/197 X |
| 3,891,247 | 6/1975 | Smith | 285/197 X |
| 3,925,851 | 12/1975 | Bevans | 24/20 TT |
| 4,128,918 | 12/1978 | Wenk | 24/20 TT |
| 4,306,740 | 12/1981 | Kleykamp et al. | 285/921 X |
| 4,608,558 | 8/1986 | Davidson | 285/197 X |
| 5,020,832 | 6/1991 | Coblentz | 285/156 X |

*Primary Examiner*—Michael F. Trettel
*Attorney, Agent, or Firm*—Fleit, Jacobson, Cohn, Price, Holman & Stern

[57] ABSTRACT

A saddle tee for irrigation pipe utilizing a unique structure for clamping the saddle tee in sealed relation to the main pipe. The saddle tee is of one-piece construction and is specifically adapted for use with underground irrigation pipe and can be used with pipes of different size within certain limits. The saddle tee is constructed of plastic material in order to eliminate corrosion and includes a clamp structure which is provided with interengaging serrated components that can be tightened into place without the use of tools such as normally required to operate two-piece clamps that are secured in clamped relation by bolts or screws and nuts. This eliminates extra parts which can become misplaced or lost and reduces the time involved in attaching a saddle tee to an irrigation pipe or the like and eliminates the necessity of carrying tools such as screwdrivers, wrenches, pliers and the like and eliminates the manual dexterity required of an installer of conventional saddle tees secured in placed by bolts or screws and nuts.

10 Claims, 1 Drawing Sheet

SADDLE TEE FOR IRRIGATION PIPE

BACKGROUND OF THE INVENTION

1. Field of the Invention

The present invention generally relates to a saddle tee for connecting a branch pipe in angular relation to a main pipe and more specifically a saddle tee for irrigation pipe utilizing a unique structure for clamping the saddle tee in sealed relation to the main pipe. The saddle tee is of one-piece construction and is specifically adapted for use with underground irrigation pipe and can be used with pipes of different size within certain limits. The saddle tee is constructed of plastic material in order to eliminate corrosion and includes a clamp structure which is provided with interengaging serrated components that can be tightened into place without the use of tools such as normally required to operate two-piece clamps that are secured in clamped relation by bolts or screws and nuts. This eliminates extra parts which can become misplaced or lost and reduces the time involved in attaching a saddle tee to an irrigation pipe or the like and eliminates the necessity of carrying tools such as screwdrivers, wrenches, pliers and the like and eliminates the manual dexterity required of an installer of conventional saddle tees secured in placed by bolts or screws and nuts.

2. Description of the Prior Art

Saddle tees are used to connect pipes in angular relation to each other in which a branch pipe intersects a main pipe. Conventional saddle tees are of two-piece split clamp structures in which the two-pieces have laterally extending lugs or ears which receive screws or bolts therethrough with retaining nuts being tightened thereon to clamp the saddle tee in place. Various efforts have been made to provide saddle tees which are exemplified in the following U.S. Pat. Nos.

3,132,881
3,891,150
4,140,155
4,316,622
4,768,741

While various efforts have been made to connect a saddle tee to a pipe, the prior art does not include a one-piece saddle tee constructed in accordance with the present invention in which the clamps are manually snapped together and tightened by interengaging serrated surfaces of arcuate configuration with arcuate opposed guide surfaces also being provided to enable the clamps to be manually snapped into adjusted position for securing the saddle tee in place with the clamps also being capable of being released when it is desired to remove the saddle tee by twisting one portion of the clamp laterally to slide the interengaging teeth of serrated surfaces apart in order to release them.

SUMMARY OF THE INVENTION

An object of the present invention is to provide a saddle tee for irrigation pipe of one-piece, plastic construction utilizing a snap together clamp structure to secure the saddle tee to the pipe in a quick and secure manner without requiring the use of screw-type fasteners and nuts and the tools necessary for tightening or loosening such fastening devices.

Another object of the invention is to provide a saddle tee specifically adapted for underground irrigation pipe, although fully capable of use with other pipes, in which the clamp structure includes arcuately extending, radially spaced telescopic components on the ends of a clamp component which encircles the pipe on which the saddle tee is mounted with opposed telescoping arcuate surfaces including interengaging serrations or teeth to enable the clamp structure at each end of the saddle tee to be snapped together by exerting manual thumb and forefinger pressure thereon although a clamping tool such as large pliers can be used if desired.

A further object of the invention is to provide a saddle tee in accordance with the preceding objects in which one end of each clamp component is integral with the body of the saddle tee and the other end of the clamp component telescopes in relation thereto with the interengaging serrations being releasable by twisting one of them laterally in relation to the other to disengage the serrations on the radially opposed surfaces of the clamp components.

Still another object of the invention is to provide a saddle tee in accordance with the preceding objects which can be quickly and easily installed without the use of extraneous fastening devices which can become lost and are difficult to manipulate and without the use of tools necessary to manipulate screw-type fasteners thereby greatly enhancing the efficiency of connecting a saddle tee to a pipe.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
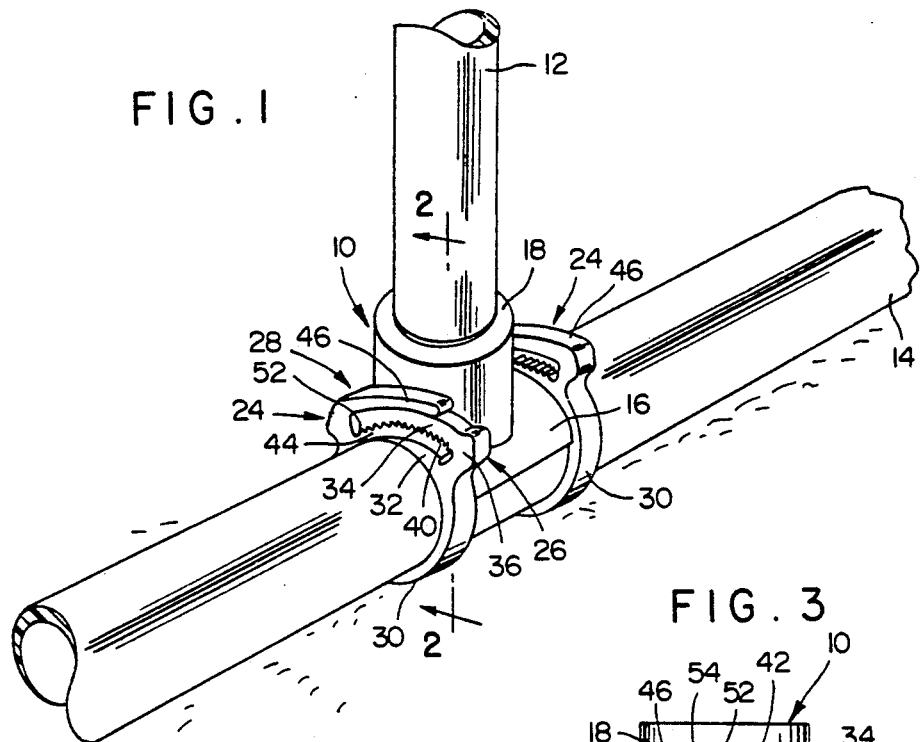
FIG. 1 is a perspective view of the saddle tee of the present invention installed on a pipe with a perpendicular pipe connected thereto.

Referring now specifically to the drawings, the saddle tee of the present invention is generally designated by reference numeral 10 and connects a branch pipe 12 to a main pipe 14 in which the main pipe 14 may be in the form of an underground irrigation pipe constructed of plastic, aluminum or other metallic or non-metallic materials. The branch pipe 12 may be an iron pipe, plastic pipe or a pipe constructed of any metallic or non-metallic materials and is illustrated in perpendicular relation to the pipe 14 although this angular relation can be varied by varying the configuration of the saddle tee.

Figure 3:
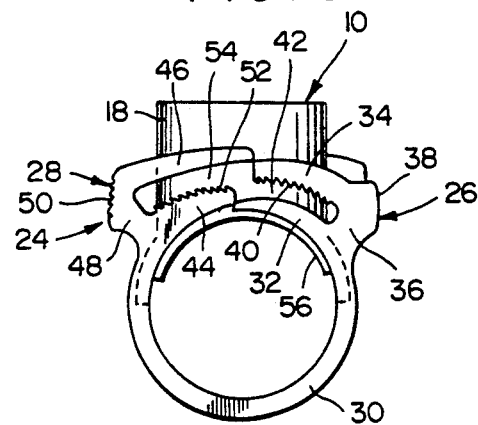
FIG. 3 is an end elevational view of the saddle tee illustrating the relationship of the clamp components on the ends of the clamp on end of the saddle tee.
Figure 2:
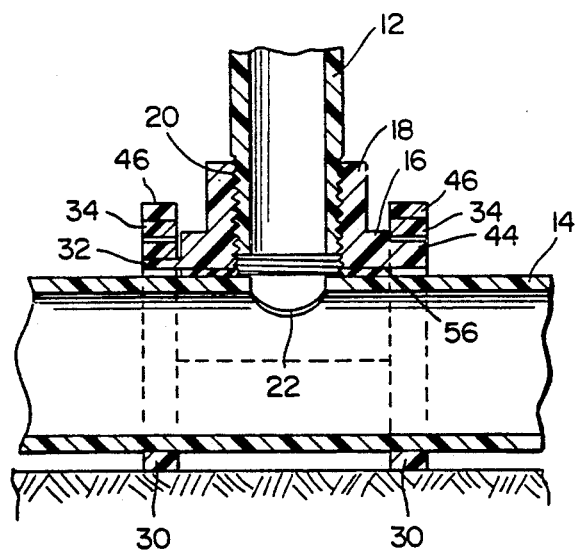
FIG. 2 is a vertical sectional view taken along section line 2—2 on FIG. 1 illustrating further structural details of the saddle tee.

The saddle tee includes an arcuate body 16 which may be substantially semi-cylindrical in configuration as illustrated in FIG. 3 with an integral female fitting 18 connected thereto which is internally threaded at 20 with the threads being standard ½ female iron pipe threads to receive the externally threaded iron pipe or nipple 12 with it being pointed out that other connecting arrangements may be employed if the pipe 12 is also of plastic material which enables it to be connected to the plastic fitting 18 by suitable adhesive or bonding agent. The pipe 14 is provided with an opening 22 to communicate the interior of the pipes 12 and 14 to enable liquids to flow through the communicated internal areas of the pipes 12 and 14.

Figure 4:
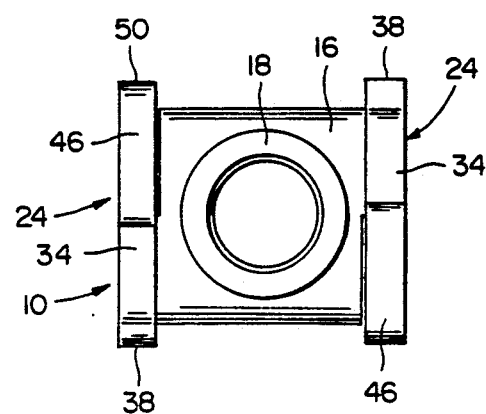
FIG. 4 is a top plan view of the saddle tee.

Each end of the saddle tee body 16 is provided with a snap together clamp generally designated by reference numeral 24 which is of unitary construction with the arcuate body 16. Each clamp structure 24 includes clamp end components 26 and 28 interconnected by a strap or band 30 which encircles the pipe 14. The clamp member 26 is integral with and stationary with respect to the body 16 while the clamp member 28 is movable relative to the clamp body 16 and the clamp member 26 as shown in FIG. 4. As illustrated in the drawings, the clamp structures 24 at the opposite ends of the body 16 are reversed in relation to each other with the clamp member 26 being on one side of the clamp body 16 at one end thereof and the clamp member 28 being on the opposite side of the clamp body 16 at the other end thereof as illustrated in FIGS. 1 and 3.

The clamp member 26 includes an inner arcuate member 32 and an outer arcuate member 34 which are radially spaced from each other and integral with the clamp band 30 with the arcuate member 34 being connected to the band 30 by a radially extending member 36 with the juncture between the radially extending member 36 and the outer arcuate member 34 forming a pad or surface 38 on which arcuate pressure can be exerted when snapping the clamping members together. The radially inner surface of the outer arcuate member 34 is provided with a plurality of teeth or serrations 40 which are inclined toward the radial member 36 as illustrated in FIGS. 1 and 3. Thus, the arcuate members 32 and 34 define an arcuate slot or space 42 with the outer surface of the inner arcuate member 32 being smooth and defining one wall of the space 42 and the inner surface of the arcuate member 34 being provided with teeth or serrations 40 and forming the other surface of the arcuate space 42. The arcuate outer surface of the arcuate member 34 is smooth and is generally parallel with the other arcuate surfaces of the arcuate members 32 and 34.

The clamp member 28 also includes an inner arcuate member 44 and an outer arcuate member 46 which are radially spaced with the arcuate member 44 being integral with the clamp band 30 and the outer arcuate member 46 connected to the clamp band 30 and the inner arcuate member 44 by a radially extending member 48 which has a pad 50 on the outer surface thereof generally paralleling the pad 38 and in opposed relation thereto with either or both of the pad surfaces 38 and 50 being serrated so that inward manual pressure can be exerted thereon. The inner surface of the inner arcuate member 44 is smooth and slides along the outer surface of the inner arcuate member 32 of the clamp member 26. The outer surface of the inner arcuate member 44 is provided with teeth or serrations 52 which incline toward the radially extending member 48 for locking interengagement with the serrations 40 on the inner surface of the outer arcuate member 34 of the clamp member 26. The inner surface of the outer arcuate member 46 on the clamp member 28 is smooth as is the outer surface thereof with the smooth inner surface of the outer arcuate member 46 being spaced from the serrations 52 thus forming a radial space 54 of arcuate extent with the inner surface of the outer arcuate member 46 slidably engaging the outer surface of the outer arcuate member 34 to retain the teeth or serrations 40 on the arcuate member 34 in locking engagement with the teeth or serrations 52 on the inner arcuate member 44. The clamp structures 24 at opposite ends of the body 16 operate in the same but opposite manner. A gasket 56 is positioned between the inner surface of the arcuate body 16 and the outer surface of the pipe 14 in surrounding relation to the aperture 22 to seal the saddle tee in relation to the pipe 14. If preferred, an 0-ring seal may be utilized in lieu of the flat gasket 56.

As illustrated in FIG. 3, the outer surface of the inner arcuate member 32 is provided with an arc which diverges from the surface of the pipe 14 thus forming a cam surface which will tighten the band 30 and thus force the body 16 tightly against the pipe 14 when the clamp members 26 and 28 are moved toward each other so that the inner surface of the inner arcuate member 44 rides upwardly on the cam surface thus camming the body 16 radially inwardly toward the peripheral surface of the pipe 14.

The saddle tee can be removed by releasing the serrations or teeth 40 from the serrations or teeth 52 which can be accomplished by gripping the radial member 36 or radial member 48 with a gripping tool such as a pair of large pliers and exerting a twisting or rotating motion on the arcuate member 34 or 44 to slide one set of teeth or serrations 40 or 52 laterally in relation to the other until the teeth or serrations are disengaged thereby enabling disassembly of the saddle tee from the pipes.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A saddle tee for mounting on the exterior of a pipe comprising a body having an internal surface conforming with the exterior surface of a pipe, a laterally extending fitting on the body and including a passageway communicating with the interior of the pipe through an opening in the pipe and a clamp structure for sealingly securing the body to the pipe, said body, fitting and clamp structure being constructed of one-piece plastic material, said clamp structure including a pair of clamp members at each end of the body and being of unitary construction therewith, each pair of clamp members being interconnected by a band disposed in encircling relation to the pipe with one of the clamp members in each pair being connected with the end portion of the body and the other of the clamp members of each pair being connected to a free end of said band, said band being free of the body, each of said clamp members, the pairs of arcuate members being including a pair of radially spaced, arcuate members oriented in telescopic interdigitated relation with one another with one pair of opposed surfaces of the arcuate members on each of said pair of clamp members including interengaging serrations to lock the pair of clamp members in inwardly telescoped relation to tighten the band about the pipe and bias said body towards the exterior surface of the pipe.

2. The saddle tee as defined in claim 1 wherein said serrations are in the form of teeth inclined toward the outer ends of the arcuate members.

3. The saddle tee as defined in claim 1 wherein a pair of clamp members at one end of the saddle tee are oppositely arranged as compared to a clamp member at the other end of the saddle tee.

4. The saddle tee as defined in claim 1 wherein an outer arcuate member in each pair of arcuate members is spaced from and connected to an inner arcuate member by a radial connecting member, each radial connecting member including an outwardly facing pad surface on which inward pressure can be exerted in opposed relation on the two pads to move the pair of clamp members into telescopic relation.

5. The saddle tee as defined in claim 1 wherein an inner arcuate member of the clamp member that is integral with the body includes an arcuate smooth outer surface which diverges away from the surface of the pipe in opposed relation to the serrated surface, the inner surface of an inner arcuate member on the other clamp member of the pair being smooth and curved to engage the smooth surface on the integral inner arcuate member in a telescopically related manner to cam the body toward the external surface of the pipe to clampingly engage the pipe.

6. The saddle tee as defined in claim 5 wherein said telescopic arcuate members are sufficiently flexible to enable the engaged serrations to be released.

7. A saddle tee for connecting a branch conduit and an intersecting pipe comprising a body having an internal surface conforming with the exterior surface of the pipe, a laterally extending fitting on the body engaged with the branch conduit and including a passageway communicating with the interior of the pipe through an opening in the pipe and clamp means securing the body to the pipe, said body, fitting and clamp means being constructed of one-piece plastic material, said clamp means including a pair of clamp members at each end of the body, each pair of clamp members being interconnected by a band disposed in encircling relation to the pipe but free of the body with one of the clamp members in each pair being connected with the end portion of the body and the other of the clamp members of each pair being connected to a free end of said band, each of said clamp members including a pair of radially spaced, arcuate members, the pairs of arcuate members being oriented in telescopic interdigitated relation with one another with one pair of opposed surfaces of the arcuate members on each of said pair of clamp members including interengaging means to lock the pair of clamp members in inwardly telescoped relation to tighten the band about the pipe and bias said body towards the exterior surface of the pipe.

8. The saddle tee as defined in claim 7 wherein said interengaging means are in the form of teeth inclined toward the outer ends of the arcuate members.

9. The saddle tee as defined in claim 8 wherein the pair of clamp members at one end of the saddle tee are oppositely arranged as compared to the clamp members at the other end of the saddle tee.

10. The saddle tee as defined in claim 9 wherein an inner arcuate member of the clamp member that is integral with the body includes an arcuate smooth outer surface which diverges away from the surface of a pipe, an inner surface of the inner arcuate member on the other clamp member of the pair being smooth and curved to engage the smooth surface on the integral inner arcuate member in a telescopically related manner to cam the body toward the external surface of the pipe to clampingly engage the pipe.

* * * * *